United States Patent Office  3,134,801
Patented May 26, 1964

3,134,801
PROCESS FOR THE PREPARATION OF O,O-DI-ALKYL - DITHIOPHOSPHORYL - FATTY ACID COMPOUNDS AND PESTICIDAL COMPOSITIONS CONTAINING THE SAME
Richard Sehring and Karl Zeile, Ingelheim (Rhine), Germany, assignors to C. H. Boehringer Sohn, Ingelheim (Rhine), Germany, a partnership
No Drawing. Filed July 9, 1959, Ser. No. 825,877
Claims priority, application Germany July 12, 1958
9 Claims. (Cl. 260—461)

The present invention relates to a process for the preparation of O,O-dialkyl-dithiophosphoryl-fatty acid compounds, and more particularly to the preparation of compounds having the general structural formula

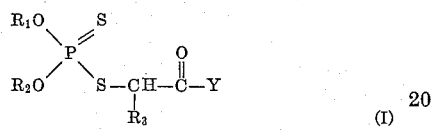

(I)

wherein $R_1$ and $R_2$ are identical or different alkyl radicals with 1 to 4 carbon atoms, $R_3$ is hydrogen, an alkyl radical with 1 to 3 carbon atoms or a phenyl radical which may have one or more nuclear halogen, lower alkyl and/or nitro substituents attached thereto, and Y is (1) a radical of the formula —OX in which X is an organic or inorganic acid radical capable of forming an anhydride, preferably a benzoyl radical, or (2) an amino radical of the formula

in which $R_4$ and $R_5$ are identical or different radicals selected from the group consisting of hydrogen, alkyl, cycloalkyl, hydroxyalkyl and aryl, or may, together with each other and the nitrogen atom, form a heterocyclic radical, such as ethyleneimino, pyrrolidyl, piperidyl or morpholyl.

The invention further relates to pesticidal compositions containing compounds of the above-indicated Formula I as active ingredients.

German Patent 819,998 describes a method of producing esters of phosphoric acid or thiophosphoric acid containing a carboxylic acid amide group, which comprises reacting salts of O,O-dialkyl-phosphoric acid or O,O-dialkyl-thiophosphoric acid with α-halo-fatty acid amides. This method, however, has considerable disadvantages in that N-substituted α-halo-fatty acid amides are difficult to produce and are obtained with very poor yields. The reasons for these production difficulties and poor yields are that the α-halo-fatty acid amides are prepared by passing through α-halo-fatty acid chlorides, which are delicate and difficult to handle because of their great reactivity.

It is an object of the present invention to provide a process for the preparation of O,O-dialkyldithiophosphoryl-fatty acid anhydrides and amides having the above-indicated structural Formula I, which does not require the use of the delicate and unstable α-halo-fatty acid chlorides as reactants.

Other objects and advantages of the invention will become apparent as the description proceeds.

We have found that O,O-dialkyl-dithiophosphoryl-fatty acid amides having the structural Formula I may be obtained without difficulty and with excellent yields by subjecting an O,O-dialkyl-dithiophosphoryl-fatty acid to a 2-step reaction in accordance with the following equations:

(1)

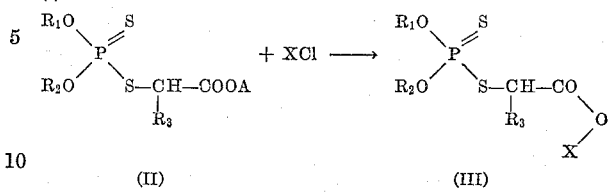

(2)

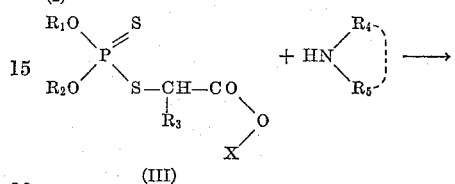

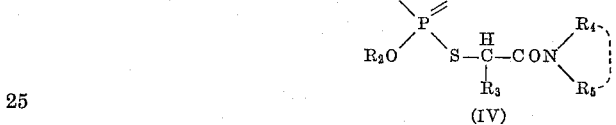

(IV)

In these equations A is a monovalent cation, X is any desired inorganic or organic acid radical, preferably a benzoyl radical, and substituents $R_1$, $R_2$, $R_3$, $R_4$ and $R_5$ have the meanings defined above in connection with Formula I.

The O,O-dialkyl-dithiophosphoryl-fatty acids used as starting materials in step 1 of this process may be readily prepared by reacting a salt of an O,O-dialkyl-dithiophosphoric acid with an α-halo-fatty acid in the presence of an inert solvent at temperatures between 10 and 100° C., for example. If this method of preparation of the O,O-dialkyl-dithiophosphoryl-fatty acid starting material is used, the salt formed by the reaction may be removed by washing the reaction solution several times with water. The free O,O-dialkyl-dithiophosphoryl-fatty acid may then be obtained as such by distilling off the solvent. In general, however, the inert solvent solution of the free O,O-dialkyl-dithiophosphoryl-fatty acid may be used directly as the starting material in the process of the invention, i.e. the free acid need not be separated from the solvent.

The dissolved O,O-dialkyl-dithiophosphoryl-fatty acid is then transformed into a neutral salt with the aid of a tertiary amine or an alkali metal carbonate, preferably triethylamide, sodium carbonate or potassium carbonate. An acid chloride of the formula XCl, wherein X is an inorganic or organic acid radical, is then added to the solution of the neutral salt at a temperature between −10 and +25° C. The mixed anhydride of the Formula III above is formed thereby. In principle, any inorganic or organic acid chloride wherein the acid radical X does not undergo reaction with the neutral O,O-dialkyl-dithiophosphoryl-fatty acid salt is suitable for this purpose. However, benzoyl chloride has been found to be particularly advantageous.

If the triethylamine salt of an O,O-dialkyl-diphosphoryl-fatty acid is used as reagent II in step 1 of the reaction according to the present invention, triethylamine hydrochloride precipitates out as the reaction proceeds. It is advantageous to remove this hydrochloride precipitate by filtration because the precipitation is very voluminous. However, if the sodium or potassium salt of an O,O-dialkyldithiophosphoryl-fatty acid is used as the starting material, the sodium chloride or potassium chloride formed by the reaction may be allowed to remain in the reaction mixture.

The mixed anhydride III may be readily isolated from the reaction mixture by evaporating the inert solvent. However, it may also be subjected to step 2 of the reaction in solution at a temperature between —10 and +25° C. with ammonia, a primary amine or a secondary amine to form the amide of the Formula IV. The reaction of the anhydride III with ammonia or a primary or secondary amine also forms a free acid of the formula XOH in addition to the amide IV. It is therefore necessary to provide an additional mol of amine or alkali metal carbonate, over and above the mol required for amide formation, to neutralize the acid XOH.

By shaking the reaction mixture with water the neutral salt of acid XOH is removed therefrom. After distilling off the solvent the O,O-dialkyl-dithiophosphoryl-fatty acid amide remains behind as the residue. It may be used for the intended purposes, as set forth below, without further purification.

The formation of the mixed anhydride III from an O,O-dialkyl-dithiophosphoryl-fatty acid and an acid chloride has heretofore never been applied to phosphoric acid esters or thiophosphoric acid esters. It was therefore entirely uncertain whether this reaction would proceed in the desired manner.

Furthermore, it is surprising that the reaction of the amine with the mixed anhydride does not hydrolyse the ester groups —OR$_1$ and —OR$_2$, and that good yields of the O,O-dialkyl-dithiophosphoryl-fatty acid amide are obtained instead of the amide of acid XOH.

As indicated above, the two reaction steps of the process according to the present invention are carried out in an inert organic solvent. Suitable solvents for this purpose are primarily hydrocarbons, high-boiling-point ethers and ketones. If R$_1$ and R$_2$ are methyl, it is more advantageous to use ketones, such as methyl-isobutyl ketone, as the inert organic solvent.

The mixed anhydrides of the Formula III obtained in the first reaction step, as well as the O,O-dialkyl-dithiophosphoryl-fatty acid amides obtained in the second reaction step exhibit excellent insecticidal and acaricidal properties. More particularly, they are effective in combatting aphids, red spiders, fruit flies and olive flies.

The following examples will further illustrate the present invention and enable others skilled in the art to understand the invention more completely. It will be understood, however, that the present invention is not limited to the particular examples given below.

EXAMPLE 1

*Preparation of O,O-Dimethyl-Dithiophosphoryl-Acetic Acid*

A solution of 180 gm. sodium O,O-dimethyl-dithiophosphate in 1000 cc. methyl-isobutyl ketone was admixed with 105 gm. chloroacetic acid and the mixture was heated for 3 hours at 65° C. The reaction mixture was then allowed to cool, shaken with 300 cc. water, the aqueous layer was decanted and the solvent was evaporated in vacuo from the organic solvent phase. 197 gm. (91.9% of theory) of O,O-dimethyl-dithiophosphoryl-acetic acid of the formula

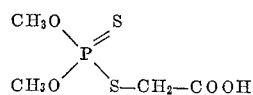

were obtained.

EXAMPLE 2

*Preparation of O,O-Dimethyl-Dithiophosphoryl-Acetic Acid Monomethyl Amide*

216 gm. O,O-dimethyl-dithiophosphoryl-acetic acid were dissolved in 1000 cc. methyl isobutyl ketone. The dissolved acid was then neutralized with 101 gm. triethylamine at a temperature between 0 and 10° C. 141 gm. benzoyl chloride were added dropwise to the solution at a temperature between —10 and 0° C., while thoroughly stirring the solution. The mixed anhydride of the formula

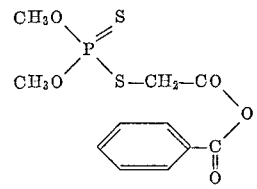

was formed thereby and remained in solution while triethylamine hydrochloride precipitated out. After 1 hour the anhydride formation was complete. The precipitated triethylamine hydrochloride was separated on a vacuum filter. 60 gm. anhydrous monomethylamine were then blown into the anhydride solution at a temperature between —10 and 0° C. The monomethylamine salt of benzoic acid precipitated out and was separated on a vacuum filter. The filtrate was washed with a small amount of water and the solvent was distilled off. 206 gm. (90% of theory) of the amide of the formula

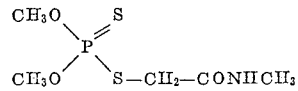

were obtained. The raw product was recrystallized from ether and in the purified state had a melting point of 51–52° C.

EXAMPLE 3

*Preparation of O,O-Dimethyl-Dithiophosphoryl-Acetic Acid Monomethyl Amide*

108 gm. O,O-dimethyl-dithiophosphoryl-acetic acid were dissolved in 1000 cc. methyl isobutyl ketone and neutralized with 35 gm. anhydrous potassium carbonate. After distilling off the water formed by the neutralization reaction the solution was cooled to between —10 and 0° C. and 70.5 gm. benzoyl chloride were added dropwise. The reaction mixture was then stirred vigorously for 2 to 3 hours; at the end of this time the formation of the anhydride of the formula

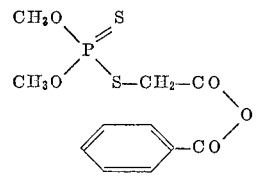

had gone to completion. The anhydride remained in solution, as did the potassium chloride. Thereafter, 26.5 gm. powdered, anhydrous sodium carbonate were added and 15 gm. monomethylamine were passed into the solution. The reaction went to completion after about 30 minutes. The reaction mixture was shaken twice with 200 cc. water; each time the sodium benzoate and potassium chloride collected in the aqueous layer which was separated. The methyl isobutyl ketone was evaporated from the organic solvent phase, yielding 100 gm. (87% of theory) of O,O-dimethyl-dithiophosphoryl-acetic acid monomethyl amide. After recrystallization from ether the melting point of the product was 51–52° C.

EXAMPLE 4

*Preparation of O,O-Dimethyl-Dithiophosphoryl-Acetic Acid Monomethyl Amide*

108 gm. O,O-dimethyl-dithiophosphoryl-acetic acid were dissolved in methyl isobutyl ketone and neutralized with 50.5 gm. triethylamine. Thereafter, the solution was cooled to between —10 and 0° C. and 70.5 gm. benzoyl chloride were added dropwise. The mixed O,O-dimethyl-dithiophosphoryl-acetic acid-benzoic acid anhydride of the formula shown in the preceding examples formed thereby and triethylamine hydrochloride precipitated out.

The reaction had gone to completion after about 1 hour, whereupon the triethylamine hydrochloride precipitate was separated on a vacuum filter. 100 gm. of a 35% aqueous monomethylamine solution were then added to the filtrate at a temperature between −5 and +10° C., accompanied by stirring. Two liquid phases formed. The aqueous phase contained the amine salt of benzoic acid and was discarded. The organic solvent phase was washed several times with water and then the methyl isobutyl ketone was distilled off, leaving as a residue O,O-dimethyl-dithiophosphoryl-acetic acid monomethyl amide. The raw product was recrystallized from ether, after which it had a melting point of 51–52° C. The yield was 85% of theory.

EXAMPLE 5

*Preparation of O,O-Dimethyl-Dithiophosphoryl-Acetic Acid Isopropyl Amide*

216 gm. O,O-dimethyl-dithiophosphoryl-acetic acid were dissolved in 1000 cc. methyl isobutyl ketone and neutralized with 101 gm. triethylamine at a temperature between 0 and 10° C. Thereafter, 141 gm. benzoyl chloride were added dropwise to the solution at a temperature between −10 and 0° C., accompanied by vigorous stirring. The reaction mixture was stirred for 1 hour during which the soluble mixed anhydride of the formula shown in Examples 2 and 3 formed, while triethlamine hydrochloride precipitated out. The precipitate was separated on a vacuum filter. 118.2 gm. isopropylamine were then added dropwise to the filtrate at a temperature of −10 to 0° C. The isopropylamine salt of benzoic acid precipitated out and was separated on a vacuum filter. The filtrate was washed with 150 cc. water and then the methyl isobutyl ketone was distilled off, leaving behind 220 gm. (85.5% of theory) of the amide having the structural formula

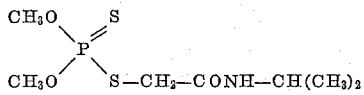

The raw product was recrystallized from ether, after which it had a melting point of 67–68° C.

EXAMPLE 6

*Preparation of O,O-Dimethyl-Dithiophosphoryl-Acetic Acid Ethyleneimide*

216 gm. O,O-dimethyl-dithiophosphoryl-acetic acid were dissolved in 1000 cc. methyl isobutyl ketone and neutralized with 101 gm. triethylamine. Thereafter, 141 gm. benzoyl chloride were added dropwise to the solution under the same conditions as those described in Examples 2 and 4. The mixed anhydride of O,O-dimethyl-dithiophosphoryl-acetic acid and benzoic acid having the structural formula shown in Examples 2 and 3 was formed, while triethylamine hydrochloride precipitated out. The precipitate was separated on a vacuum filter and 88 gm. ethyleneimine were added dropwise to the filtrate at a temperature between −10 and 0° C., accompanied by stirring. The reaction went to completion in about 1 hour. The reaction mixture was shaken twice with 200 ml. water, the aqueous phase being separated and discarded each time. Thereafter, the methyl isobutyl ketone was distilled out of the organic phase, leaving 200 gm. (82.5% of theory) of O,O-dimethyl-dithiophosphoryl-acetic acid ethyleneimide of the formula

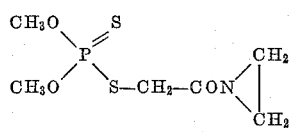

in the form of a light yellow oil.

*Analysis.*—Calculated: N, 5.78%. Found: N, 5.54%.

EXAMPLE 7

*Preparation of O,O-Diethyl-Dithiophosphoryl-Acetic Acid Butylamide*

122 m. O,O-diethyl-dithiophosphoryl-acetic acid were dissolved in 600 cc. toluene and neutralized with 50.5 gm. triethylamine. 70.5 gm. benzoyl chloride were added dropwise and slowly to the solution at a temperature between −10 and 0° C., accompanied by stirring. The formation of the mixed anhydride having the structural formula

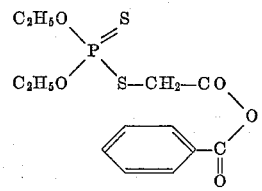

went to completion in about 30 minutes, while triethylamine hydrochloride precipitated out. The precipitate was separated on a vacuum filter and 146.3 gm. butylamine were added slowly and dropwise to the filtrate at a temperature between −10 and 0° C. The butylamine salt of benzoic acid which precipitated out was separated from the reaction mixture after stirring it for about 30 minutes. The filtrate was then washed with 100 cc. water and dried with anhydrous sodium sulfate. The toluene was then evaporated in vacuo, leaving 251 gm. (81.4% of theory) of O,O-diethyl-dithiophosphoryl-acetic acid butylamide of the formula

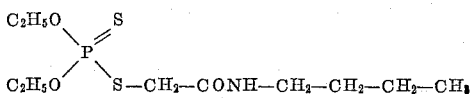

in the form of a thick yellow oil.

*Analysis.*—Calculated N, 4.68%. Found: N, 4.51%.

EXAMPLE 8

*Preparation of O-Methyl-O-Ethyl-Dithiophosphoryl-Acetic Acid Monomethylamide*

115 gm. O-methyl-O-ethyl-dithiophosphoryl-acetic acid were dissolved in 500 cc. methyl isobutyl ketone and neutralized with 50.5 gm. triethylamine. 70.5 gm. benzoyl chloride were then added dropwise to the solution at a temperature between −10 and 0° C., whereby the mixed anhydride of the formula

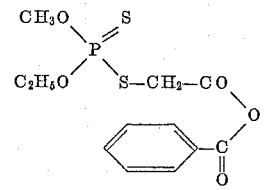

was formed in solution, while triethylamine hydrochloride precipitated out. The reaction went to completion after about 1 hour whereupon the triethylamine precipitate separated on a vacuum filter. While stirring, 16.0 gm. monoethylamine were then passed into the filtrate at a temperature between −5 and +10° C. This reaction went to completion after 30 minutes. The solvent was distilled off in vacuo (20 to 30 mm. Hg). The residue was cooled, whereby the benzoic acid formed during the reaction precipitated out. The benzoic acid was separated on a vacuum filter. 108 gm. (88.9% of theory) of the compound having the structural formula

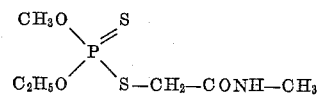

were obtained in the form of a non-distillable oil.

*Analysis.*—Calculated: N, 5.75%. Found: N, 5.58%.

EXAMPLE 9

*Preparation of O-Methyl-O-Isopropyl-Dithiophosphoryl-Acetic Acid Monomethylamide*

By following the procedure described in Example 8, but using 122 gm. O-methyl-O-isopropyl-dithiophosphoryl-acetic acid, instead of 115 gm. O-methyl-O-ethyl-dithiophosphoryl acetic acid, the mixed anhydride having the structural formula

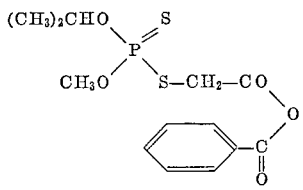

and ultimately the compound having the structural formula

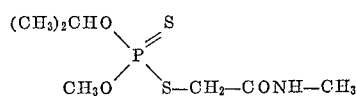

were obtained. The yield of the monomethylamide was 120 gm., which is equivalent to 93.3% of theory.

*Analysis.*—Calculated: N, 5.44%. Found: N, 5.31%.

EXAMPLE 10

*Preparation of O-Methyl-O-Ethyl-Dithiophosphoryl-Acetic Acid β-Hydroxyethylamide*

By following the procedure described in Example 8, but using 30.5 gm. ethanolamine instead of 16.0 gm. monomethylamine, 123 gm. (95.0% of theory) of the compound having the structural formula

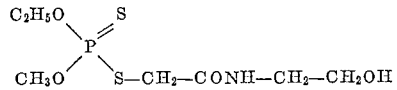

were obtained in the form of a light yellow oil.

*Analysis.*—Calculated: N, 5.40%. Found: N, 5.31%.

EXAMPLE 11

*Preparation of O-Methyl-O-Isopropyl-Dithiophosphoryl-Acetic Acid-Ethylamide*

By following the procedure described in Example 7, but using 122 gm. O-methyl-O-isobutyl-dithiophosphoryl-acetic acid and 22.5 gm. ethylamine in place of O-methyl-O-ethyl-dithiophosphoryl-acetic acid and monomethyl-amine, 125 gm. (92.3% of theory) of the compound having the structural formula

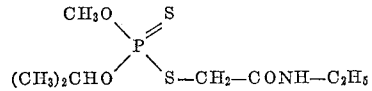

were obtained in the form of a light yellow oil.

*Analysis.*—Calculated: N, 5.17%. Found: N, 5.11%.

EXAMPLE 12

*Preparation of O-Methyl-O-Isopropyl-Dithiophosphoryl-Acetic Acid Isopropylamide*

By following the procedure described in Example 8, but using 122 gm. O-methyl-O-isopropyl-dithiophosphoryl acetic acid and 29.5 gm. isopropylamine in place of O--methyl-O-ethyl-dithiophosphoryl-acetic acid and monomethylamine, 135 gm. (94.8% of theory) of the compound having the structural formula

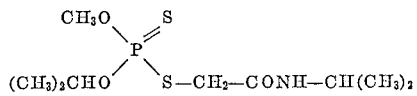

were obtained in the form of a light yellow oil.

*Analysis.*—Calculated: N, 4.90%. Found: N, 4.96%.

EXAMPLE 13

*Preparation of O,O,-Dimethyl-Dithiophosphoryl-Acetic Acid Monoethylamide*

216 gm. O,O-dimethyl-dithiophosphoryl-acetic acid were dissolved in 1000 cc. methyl isobutyl ketone and neutralized with 101 gm. triethylamine under the conditions described in Example 2. Thereafter, 141 gm. benzoyl chloride were added to the solution, accompanied by stirring. The triethylamine hydrochloride precipitate was filtered off on a vacuum filter and 90 gm. ethylamine were added to the filtrate at a temperature between −10 and 0° C. After filtering the reaction mixture and evaporating the solvent from the filtrate, 211 gm. (87% of theory) of the compound having the structural formula

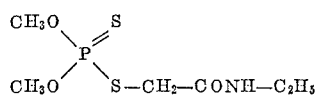

were obtained in the form of a light yellow non-distillable oil.

*Analysis.*—Calculated: N, 5.78%. Found N, 5.62%.

EXAMPLE 14

*Preparation of O,O - Dimethyl-Dithiophosphoryl-Acetic Acid N-Methyl-N-(α-Hydroxy-β-Trichloroethyl)-Amide*

89.2 gm. (0.5 mol) N-methyl-N-α-hydroxy-β-trichloroethylamine were dissolved in 150 cc. methyl isobutyl ketone and the solution was added dropwise to a solution of 160 gm. O,O-dimethyl-dithiophosphoryl-acetic acid benzoic acid anhydride in 400 cc. methyl isobutyl ketone. The mixture was stirred at room temperature for 3 hours. Thereafter, the solvent was distilled off, and the residue was allowed to stand for a short period of time whereupon benzoic acid crystallized out. The precipitate was separated on a vacuum filter. The filtrate was the amide having the structural formula

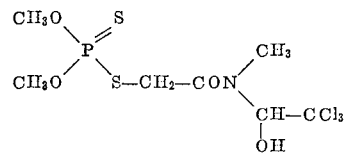

in the form of a yellowish brown oil contaminated with about 5% benzoic acid. By dissolving this oil in methyl isobutyl ketone and shaking this solution with an aqueous sodium bicarbonate solution the residual benzoic acid was removed. The pure amide was a non-distillable oil. The yield was 82% of theory.

*Analysis.*—Calculated: N, 3.72%; Cl, 28.3%. Found: N, 3.47%; Cl, 28.6%.

The hydroxy-substituted alkyl amines employed as reagents in this example as well as in Examples 15 and 16 were prepared by heating a solution of molar amounts of the alkylamine in an anhydrous inert solvent dropwise to anhydrous chloral at a temperature below 0° C., accompanied by stirring, in accordance with the procedure described in "Annalen der Chemie," volume 157, page 114.

EXAMPLE 15

*Preparation of O,O-Diethyl-Dithiophosphoryl-Acetic Acid N-Methyl-N-(α-Hydroxy-β-Trichloroethyl) Amide*

A solution of 89.2 gm. (0.5 mol) N-methyl-N-(α-hydroxy-β-trichloroethyl)amine in 150 cc. methyl isobutyl ketone was added dropwise to a solution of 174 gm. (0.5 mol) O,O-diethyl-dithiophosphoryl-acetic acid benzoic acid anhydride in 400 cc. methyl isobutyl ketone. The reaction periods and the separation procedure were analogous to those described in Example 14. 79.7% of theory of the compound having the structural formula

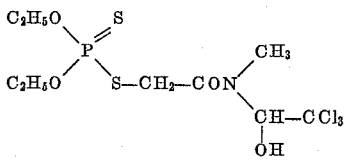

were obtained in the form of a non-distillable yellowish brown oil.

*Analysis.*—Calculated: N, 3.46%; Cl, 26.8%. Found: N, 3.19%; Cl. 27.0%.

EXAMPLE 16

*Preparation of O,O - Dimethyl-Dithiophosphoryl-Acetic Acid N-Isopropyl-N-(α-Hydroxy-β-Trichloroethyl)-Amide*

A solution of 103.2 gm. (0.5 mol) N-isopropyl-N-(α-hydroxy-β-trichloroethyl) amine in 200 cc. methyl isobutyl ketone was added dropwise to a solution of 160 gm. (0.5 mol) O,O-dimethyl-dithiophosphoryl-acetic acid benzoic acid anhydride in 400 cc. methyl isobutyl ketone. The reaction periods and the method of separation were analogous to those described in Example 14. 84% of theory of the compound having the structural formula

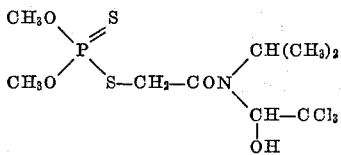

were obtained in the form of a light brown non-distillable oil.

*Analysis.*—Calculated: N, 3.46%; Cl, 26.8%. Found: N, 3.32%; Cl, 27.0%.

As previously pointed out, the compounds having structural Formula I disclosed herein are useful as insecticidal and acaricidal agents. For the purpose of using these compounds for the indicated purposes, they are dissolved in customary solvents or propellant gases to form insecticidal and acaricidal sprays or aerosols. For effective use, the insecticidal and acaricidal compositions containing the compounds of the Formula I disclosed herein should comprise at least 0.005% by weight of these compounds, and preferably from 0.005 to 0.1% by weight.

While we have disclosed certain specific embodiments of our invention, it is understood that we do not wish to limit ourselves to these embodiments, and it will be readily apparent to others skilled in the art that various other changes and modifications may be made without departing from the spirit of the invention or the scope of the appended claims.

We claim:

1. Compounds having the structural formula

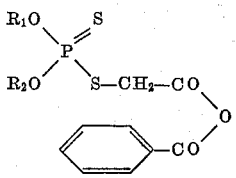

wherein $R_1$ and $R_2$ are lower alkyl.

2. The mixed anhydride of O,O-dimethyl-dithiophosphoryl-acetic acid and benzoic acid.

3. The mixed anhydride of O,O-diethyl-dithiophosphoryl-acetic acid and benzoic acid.

4. The mixed anhydride of O-methyl-O-ethyl-dithiophosphoryl-acetic acid and benzoic acid.

5. The mixed anhydride of O-methyl-O-isopropyldithiophosphoryl-acetic acid and benzoic acid.

6. O,O - dimethyl - dithiophosphoryl - acetic acid N-methyl-N-(α-hydroxy-β-trichloroethyl)-amide.

7. O,O-diethyl-dithiophosphoryl-acetic acid N-methyl-N-(α-hydroxy-β-trichloroethyl)-amide.

8. O,O-dimethyl - dithiophosphoryl - acetic acid N-isopropyl-N-(α-hydroxy-β-trichloroethyl)-amide.

9. The process of producing compounds of the formula

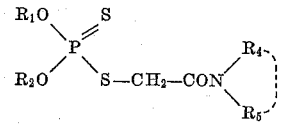

wherein $R_1$ and $R_2$ are lower alkyl and $R_4$ and $R_5$ are selected from the group consisting of hydrogen, lower alkyl, hydroxy-alkyl, hydroxy-halolower alkyl and, together with each other and the adjacent nitrogen atom, a heterocyclic radical selected from the group consisting of ethyleneimino, pyrolidyl, piperidyl and morpholyl, which comprises reacting a neutral salt of an O,O-dialkyldithiophosphoryl-fatty acid of the formula

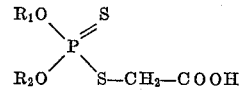

wherein $R_1$ and $R_2$ have the meanings defined above, with benzoyl chloride at a temperature between —10 and +25° C. in the presence of an inert organic solvent to form a mixed anhydride of the formula

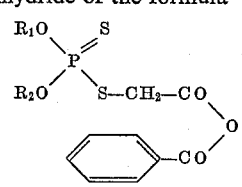

wherein $R_1$ and $R_2$ have the meanings defined above, and reacting said mixed anhydride with an amine of the formula

wherein $R_4$ and $R_5$ have the meanings defined above.

References Cited in the file of this patent

UNITED STATES PATENTS

| | | |
|---|---|---|
| 2,494,283 | Cassaday et al. | Jan. 10, 1950 |
| 2,630,451 | Fletcher et al. | Mar. 3, 1953 |
| 2,890,947 | Annable et al. | June 16, 1959 |

FOREIGN PATENTS

| | | |
|---|---|---|
| 195,445 | Austria | Feb. 10, 1958 |
| 791,824 | Great Britain | Mar. 12, 1958 |

OTHER REFERENCES

Degering et al.: "An Outline of Organic Chemistry" (1937) Barnes and Noole Inc., New York, N.Y., pp. 82–84.